United States Patent [19]

Kerviel et al.

[11] Patent Number: 4,642,496
[45] Date of Patent: Feb. 10, 1987

[54] DEVICE FOR DETECTING THE ANGULAR POSITION OF THE ROTOR OF A ROTARY ELECTRIC MACHINE WITH ELECTRONIC SWITCHING

[75] Inventors: Alain Kerviel; Rémy Barbarin, both of Chatellerault, France

[73] Assignee: Societe Francaise d'Equipements pour la Navigation Aeriene (S.F.E.N.A.), France

[21] Appl. No.: 736,740

[22] Filed: May 22, 1985

[30] Foreign Application Priority Data

May 22, 1984 [FR] France .................................. 84 08300

[51] Int. Cl.$^4$ ............................................. H02K 11/00
[52] U.S. Cl. .................................. 310/68 B; 318/254; 310/68 R
[58] Field of Search ................... 310/68 R, 68 B, 138, 310/268, 67; 318/254, 254 A

[56] References Cited

U.S. PATENT DOCUMENTS

| | | | |
|---|---|---|---|
| 4,074,173 | 2/1978 | Janssen | 318/254 A |
| 4,086,519 | 4/1978 | Perssol | 310/68 B |
| 4,217,508 | 8/1980 | Uzuka | 310/67 |
| 4,311,933 | 1/1982 | Riggs | 310/68 R |
| 4,475,068 | 10/1984 | Brailsford | 318/254 |

*Primary Examiner*—Donovan F. Duggan
*Attorney, Agent, or Firm*—William A. Drucker

[57] ABSTRACT

A device for detecting the angular position of the rotor of an electric rotary machine with electronic switching, comprising more particularly a disk mounted coaxially on the shaft of said rotor and comprising a radial face on which permanent magnets are fixed of alternately reversed polarity producing a magnetic field, Hall effect proximity cells disposed in the vicinity of said radial face of the disk and carried by a structure mounted for rotation on the body of said rotary machine coaxially with said axis, and adapted for detecting the axial component of the magnetic field, means allowing said structure to be locked against rotation on said body.

5 Claims, 2 Drawing Figures

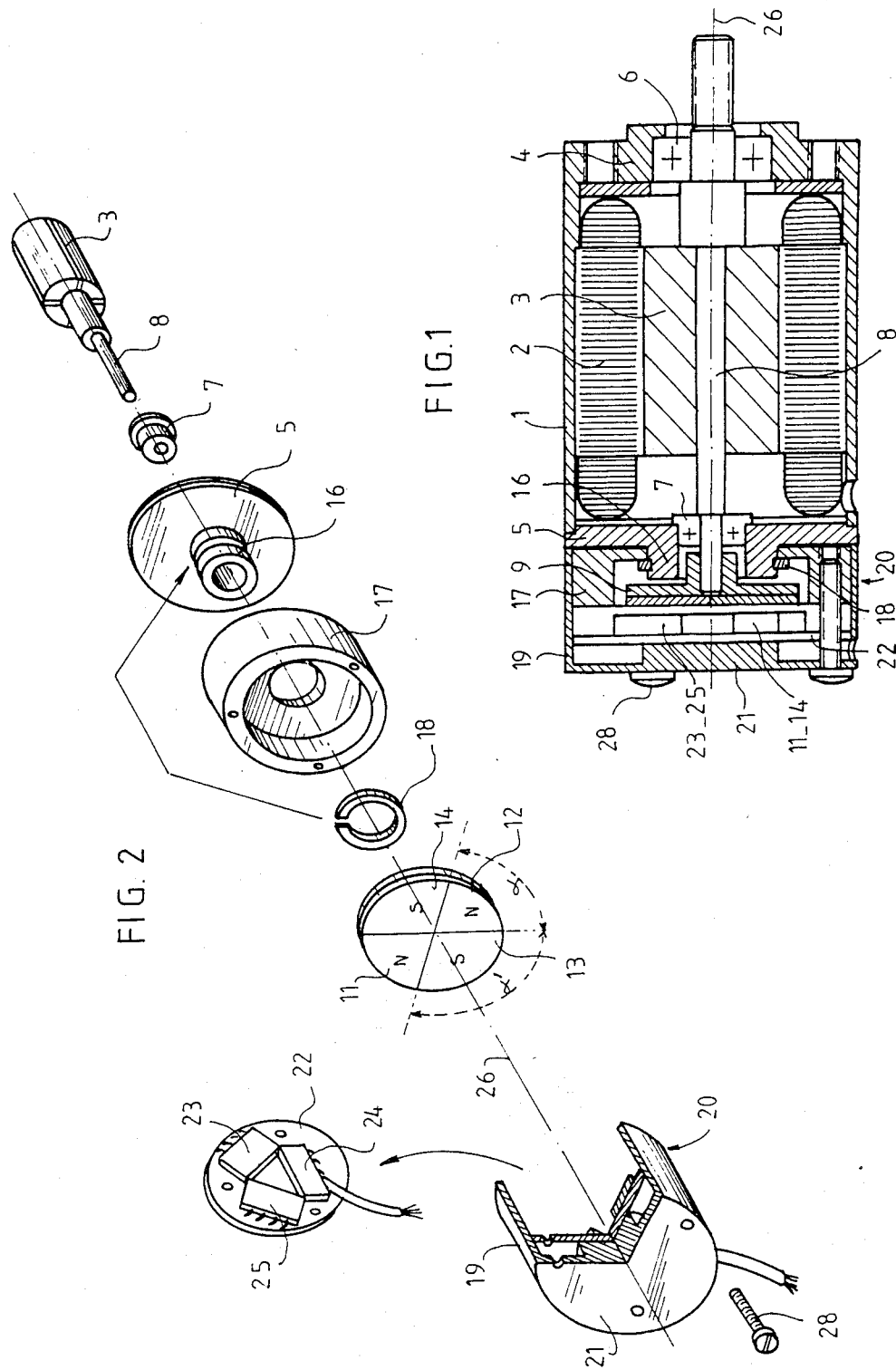

DEVICE FOR DETECTING THE ANGULAR POSITION OF THE ROTOR OF A ROTARY ELECTRIC MACHINE WITH ELECTRONIC SWITCHING

BACKGROUND OF THE INVENTION

1. Field of the Invention

The present invention relates to a device for detecting the angular position of the rotor of a rotary electric machine such as an electric motor with electronic switching.

2. Description of the Prior Art

Generally a rotary electric machine is formed from a stator and a rotor equipped with two respective mutually facing magnetic circuits each comprising a plurality of magnetic poles of alternating polarity.

Thus, in some of these machines, the stator is designed so as to induce a stationary magnetic field, whereas the rotor is provided with armature windings creating a rotating magnetic field. The interaction between the magnetic field of the rotor and that of the stator, staggered with respect to each other, forms an electromagnetic couple. In order to form a couple with a constant direction, the direction of the current in each armature winding must change when it passes from one magnetic pole to another of the stator, of opposite polarity. This change is generally provided by means of a switch adapted for supplying the armature coils with power depending on the relative position of the magnetic fields of the inductor and of the armature and of a given angular shift.

Conversely, in another type of machine, the stator is provided with inductor windings adapted for generating a rotating magnetic field, whereas the rotor is provided with poles having a constant magnetic field. In this case, the machine comprises a switch for changing the direction of the current in the inductor windings depending on the angular position of the rotor.

In one case as in the other, the switch must necessarily involve a device for supplying with the power the different windings whose field is to be modified, a device for detecting the angular position of the poles of the rotor and a selector which determines the supply mode for these windings depending on said angular position and on the desired direction of rotation.

For detecting the angular position of the poles of the rotor, numerous solutions have been proposed, these solutions involving more especially magnetic sensors, capacitive sensors, optical sensors or even Hall effect sensors.

For this latter type of sensor, a solution generally used consists in mounting in the stator a Hall effect cell which supplies a voltage representative of the position of the rotor by means of its own rotating field. However, this solution is not always applicable and does not allow good accuracy to be obtained.

Another solution consists in using a coded disk, made from a ferromagnetic material mounted at the end of the rotor shaft and, disposed facing this disk and on each side thereof, a permanent magnet and a Hall effect cell. One drawback of this circuit is that, under the effect of the magnetic field of the permanent magnet, the ferromagnetic material disk is the seat of eddy currents which risk disturbing the operation of the motor. Furthermore, because of the presence of the disk, the gap between the permanent magnet and the cell is relatively large, which leads to using relatively powerful magnets which risk generating magnetic parasites, and high sensitivity cells.

SUMMARY OF THE INVENTION

The aim of the invention is therefore to provide a detection device using Hall effect cells which is free of the above-mentioned drawbacks and which further presents the following advantages:

great simplicity of design and use and, consequently, a low cost price, good reliability and good resistance to high temperatures, great ease of maintenance because of structural independence from the rest of the motor, and great ease of setting the detector with respect to the static windings of the motor.

To attain this result, the detection device of the invention comprises:

a disk mounted coaxially on the motor shaft and comprising a radial face on which are fixed permanent magnets of alternately reversed polarity producing an electric field, Hall effect proximity cells disposed in the vicinity of said radial face and carried by a structure mounted for rotation on the body of the rotating machine coaxially with the motor shaft, and adapted for detecting the axial component of said field, means for locking said structure against rotation on said body in the desired angular position.

In a particularly advantageous embodiment of the invention, said permanent magnets are in the form of circular sectors arranged concentrically so as to cover said radial face of the disk, these sectors being possibly fixed by bonding.

Because of the nature of the magnetic induction at the level of the transition from one sector to another, the change of state of the cells occurs alternately before and after passing from one sector to another. Consequently, so as to obtain correct detection of the position, it is appropriate to adopt different sector angles depending on whether it is a North pole sector or a South pole sector.

Of course, the invention applies not only to machines with external rotor but also to electric machines with internal rotor.

BRIEF DESCRIPTION OF THE DRAWINGS

One embodiment of the invention will be described hereafter by way of non limitative example with reference to the accompanying drawings in which:

FIG. 1 is an axial section of a motor equipped with a detection device in accordance with the invention, FIG. 2 is a schematical exploded view showing the part of the motor shown in FIG. 1 on which the detection device is mounted.

DESCRIPTION OF THE PREFERRED EMBODIMENT

Such as shown in these figures, the motor is formed conventionally from a tubular body 1 containing a wound stator 2 inside which is rotatably mounted a permanent magnet rotor 3. This body 1 is closed at each of its ends by a front lid or plate 4 and a rear lid 5 each comprising a ball bearing 6,7 through which passes the shaft 8 of rotor 3.

On the end of shaft 8 of the rotor, projecting from bearing 7, is mounted a disk 9 whose external radial face is covered by four permanent magnets 11, 12, 13, 14 in the form of concentric circular sectors, namely two diametrically opposite North pole magnets 11,12 and two South pole magnets 13,14 also diametrically opposite.

These magnets 11 to 14 may be formed from agglomerate or compressed type magnets with plastic bonding agent, of a low cost but limited to temperatures less than 80° C., or metal rare earth magnets for higher temperatures.

As mentioned above, so as to take into account the leak fluxes between magnets, the angles at the center α of the permanent North pole magnets 11, 12 are different from the angles at the center 60 ' of the permanent South pole magnets 13,14. This angular difference depends more especially on the distance between the Hall effect cells used and the permanent magnets 11 to 14, on the nature of the magnet used and on the sensitivity of said cells.

Moreover, the rear lid 5 comprises, around bearing 7, a sleeved part 16 which extends axially rearwards and on which is rotatably mounted an annular piece 17, retained axially outwardly by a ring 18 fitted in a circular groove formed in the sleeved part 16.

On the outer surface of this annular piece 17 is engaged the tubular skirt 19 of a cover 20, whose bottom 21 comprises, on the inner side, a printed circuit 22 comprising three Hall effect cells 23,24,25 disposed in an equilateral triangle centered on the axis 26 of shaft 8 of rotor 3.

This printed circuit 22, which has a circular shape, is mounted so that once the cover 20 is fitted to the angular piece 17, it extends parallel to disk 9 and so that the gap between the Hall effect cells 23 to 25 and the magnets 11 to 14 of disk 9 is as small as possible.

Cover 20 is screwed to the annular piece 17 by axial screws 28.

The invention is not limited to this single type of mounting and this securing of the cover. A less costly solution could be to arrange on the rear lid 5, possibly without the sleeved part 16, a shoulder on which the cover engages. After the angular setting of the cover, and consequently of the Hall effect cells, securing may then be obtained by simply bonding the cover 20 on lid 5, the setting of the motor then being effected during bonding.

It is clear that with the structure illustrated in the drawing the adjustment of the angular position of the Hall effect cells 23–25 with respect to the angular position of the poles of the stator 2, i.e. the setting of the detection device, may be readily obtained by pivoting the assembly formed by cover 20, printed circuit 22 with its Hall effect cells 23–25 and the annular piece 17 with to body 1 of the motor without any dismantling. Locking in position may then be obtained for example by means of a set screw for example one of screws 28 coming into abutment at the end of travel against lid 5. In addition, maintenance of the detection device and of the electronic circuit associated therewith is considerably facilitated because the part of the detection circuit incorporated in the motor is removed at the same time as cover 20 and may therefore be readily tested or even replaced. It will be noted in this connection that the fact that the Hall effect cells 23, 24, 25 are mounted on the same printed circuit board 22, allows maximum integration of the associated electronic circuits and, in particular, the use of integrated circuits or hybrid circuits comprising the whole or part of the detection function and shaping of the detection signal. In this configuration, the motor with its electronics becomes interchangeable with a motor having conventional slip-ring brushes.

This arrangement is particularly advantageous for constructing small sized integrated electronic circuit motors, for example of the order of ten millimeters or so.

Of course, the invention is not limited to a detection device comprising a disk 9 having four permanent magnets 11, 12, 13, 14 and three Hall effect cells.

In fact, the number of magnets used as well as the number of Hall effect cells are variable depending on the resolution which it is desired to obtain.

What is claimed is:

1. A device for detecting the angular position of the rotor of a rotating electric machine comprising, inside a body, a rotor mounted for rotation about a first rotation axis in a stator, said rotor and said stator being equipped with two respective mutually facing magnetic circuits and comprising a plurality of magnetic poles of alternating polarity, said device further comprising:

an additional disk mounted coaxially on the shaft of the rotor and comprising a radial face;

first and second pluralities of permanent magnets in the form of circular sectors which produce a magnetic field independent on that of said rotor and said stator and which are arranged concentrically to a center point located on said first rotational axis and bonded to the radial face of the disk, the permanent magnets of said first plurality each having a first polarity and first and second radial edges which form a first angle, the permanent magnets of the second plurality each having a second polarity and third and fourth radial edges which form a second angle, and the permanent magnet of the first plurality alternating with the permanent magnets of the second plurality with each radial edge of the permanent magnets of the first plurality extending against one radial edge of one permanent magnet of the second plurality so as to cover said radial face;

Hall effect proximity cells each having sensible surfaces in a plane parallel to said radial plane and in the vicinity thereof, said cells being carried by a structure mounted for rotation about a second rotational axis coaxial to said first rotational axis, and means for locking said structure against rotation on said body.

2. The device as claimed in claim 1, wherein the said first and second angles are different.

3. A device for detecting the angular position of the rotor of a rotating electric machine comprising, inside a body, a rotor mounted for rotation about a first rotational axis in a stator, said rotor and said stator being equipped with two respective mutually facing magnetic circuits and comprising a plurality of magnetic poles of alternating polarity, said device further comprising an additional disk mounted coaxially on the shaft of the rotor and comprising a radial face on which are fixed permanent magnets of alternately reversed polarity producing a magnetic field independent of that of said rotor and said stator, Hall effect proximity cells disposed in the vicinity of said radial face of the disk and carried by a structure which consists at least partially of a cover and which is mounted for rotation on the body of the rotary machine coaxially to said shaft, and adapted for detecting the axial component of the magnetic field emitted by said permanent magnets, wherein said body is closed on one side by a rear lid having a bearing through which the shaft of said rotor passes, said disk is mounted on the end of said shaft projecting from said bearing, said lid comprises around said bearing, a sleeved part which extends axially outwardly and on which an axially retained annular piece is mounted for rotation, and on the outer surface of said annular piece is engaged the tubular skirt of said cover.

4. The device as claimed in claim 3, wherein said cover is fixed to said annular piece by means of axial screws.

5. The device as claimed in claim 4, wherein said cover is locked against rotation by means of one of said screws which, at the end of screwing up, comes into abutment against said lid.

* * * * *